United States Patent
Katsumata et al.

(10) Patent No.: US 11,398,077 B2
(45) Date of Patent: Jul. 26, 2022

(54) REPRODUCING DEVICE, REPRODUCING METHOD, RECORDING DEVICE, RECORDING METHOD, REPRODUCING/RECORDING DEVICE, AND REPRODUCING/RECORDING METHOD FOR DISPLAY OF A 3D MODEL ARRANGED IN A SPACE RECREATED BY A FREE VISUAL POINT MOVING IMAGE STREAM

(71) Applicant: SONY CORPORATION, Tokyo (JP)

(72) Inventors: Mitsuru Katsumata, Tokyo (JP); Shihhao Wen, Tokyo (JP)

(73) Assignee: SONY CORPORATION, Tokyo (JP)

( * ) Notice: Subject to any disclaimer, the term of this patent is extended or adjusted under 35 U.S.C. 154(b) by 522 days.

(21) Appl. No.: 16/330,616

(22) PCT Filed: Sep. 22, 2017

(86) PCT No.: PCT/JP2017/034238
§ 371 (c)(1),
(2) Date: Mar. 5, 2019

(87) PCT Pub. No.: WO2018/066382
PCT Pub. Date: Apr. 12, 2018

(65) Prior Publication Data
US 2021/0287432 A1 Sep. 16, 2021

(30) Foreign Application Priority Data
Oct. 6, 2016 (JP) .............................. JP2016-198250

(51) Int. Cl.
*H04N 13/178* (2018.01)
*G06T 17/30* (2006.01)
(Continued)

(52) U.S. Cl.
CPC .............. *G06T 17/30* (2013.01); *G06T 15/20* (2013.01); *G06T 17/20* (2013.01); *H04N 13/178* (2018.05); *H04N 13/189* (2018.05)

(58) Field of Classification Search
CPC ......................... H04N 13/117; H04N 21/8146
See application file for complete search history.

(56) References Cited

U.S. PATENT DOCUMENTS

2008/0081701 A1* 4/2008 Shuster ................... A63F 13/35
463/42
2009/0324202 A1 12/2009 Okubo et al.
(Continued)

FOREIGN PATENT DOCUMENTS

CN 102067591 A 5/2011
EP 2293553 A1 3/2011
(Continued)

OTHER PUBLICATIONS

International Search Report and Written Opinion of PCT Application No. PCT/JP2017/034238, dated Nov. 7, 2017, 09 pages of ISRWO.
(Continued)

Primary Examiner — Ryan McCulley
(74) Attorney, Agent, or Firm — Chip Law Group

(57) ABSTRACT

The present disclosure relates to a reproducing device, a reproducing method, a recording device, a recording method, a reproducing/recording device, a reproducing/recording method, and a program capable of supporting more appropriate 3D model display. A reproduction processing unit reproduces free visual point moving image content including a free visual point moving image stream and an edit data stream, and display of a 3D model arranged in a space recreated by the free visual point moving image stream in accordance with basic information set in edit data constituting the edit data stream is controlled with reference (Continued)

to additional information set in the edit data. The present technology can be applied to, for example, a reproducing device capable of reproducing free visual point moving image content.

13 Claims, 10 Drawing Sheets

(51) Int. Cl.
*H04N 13/189* (2018.01)
*G06T 15/20* (2011.01)
*G06T 17/20* (2006.01)

(56) References Cited

U.S. PATENT DOCUMENTS

2014/0343404 A1* 11/2014 Razzaque ............ A61B 8/0841
600/424
2017/0061600 A1* 3/2017 Cole ..................... A63F 13/79
2017/0286993 A1* 10/2017 Khalid ................. G06T 19/006

FOREIGN PATENT DOCUMENTS

| | | |
|---|---|---|
| JP | 2006-014090 A | 1/2006 |
| JP | 2012-213220 A | 11/2012 |
| JP | 2014-032443 A | 2/2014 |
| JP | 2014-183502 A | 9/2014 |
| JP | 2015-187797 A | 10/2015 |
| WO | 2009/157198 A | 12/2009 |
| WO | 2009/157198 A1 | 12/2009 |

OTHER PUBLICATIONS

Office Action for JP Patent Application No. 2018-543838, dated Mar. 16, 2021, 03 pages of English Translation and 03 pages of Office Action.

* cited by examiner

FIG. 3

| | EXEMPLARY HELD INFORMATION |
|---|---|
| TIME INFORMATION | INFORMATION INDICATING 3D MODEL DISPLAY PERIOD<br>· START TIME, FINISH TIME |
| 3D MODEL INFORMATION | INFORMATION INDICATING 3D MODEL<br>· DATA OF 3D MODEL ITSELF (Object/Texture)<br>· ID INDICATING 3D MODEL |
| OPERATION INFORMATION | INFORMATION INDICATING OPERATION FOR 3D MODEL<br>· SETTING FOR ROTATION, ENLARGEMENT/REDUCTION, ERASING, AND TRANSPARENCY |
| POSITION INFORMATION | INFORMATION INDICATING POSITION OF 3D MODEL IN SPACE<br>· COORDINATES AND THE LIKE |
| ADDITIONAL INFORMATION | PRIORITY INFORMATION<br>VIEWING AGE RESTRICTION INFORMATION |

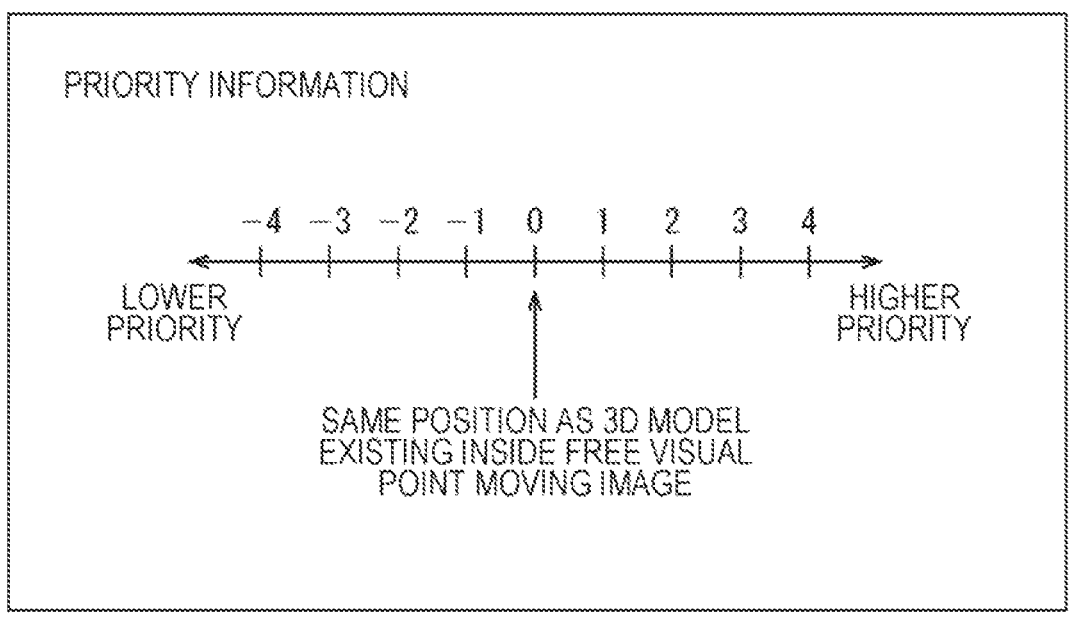

FIG. 4

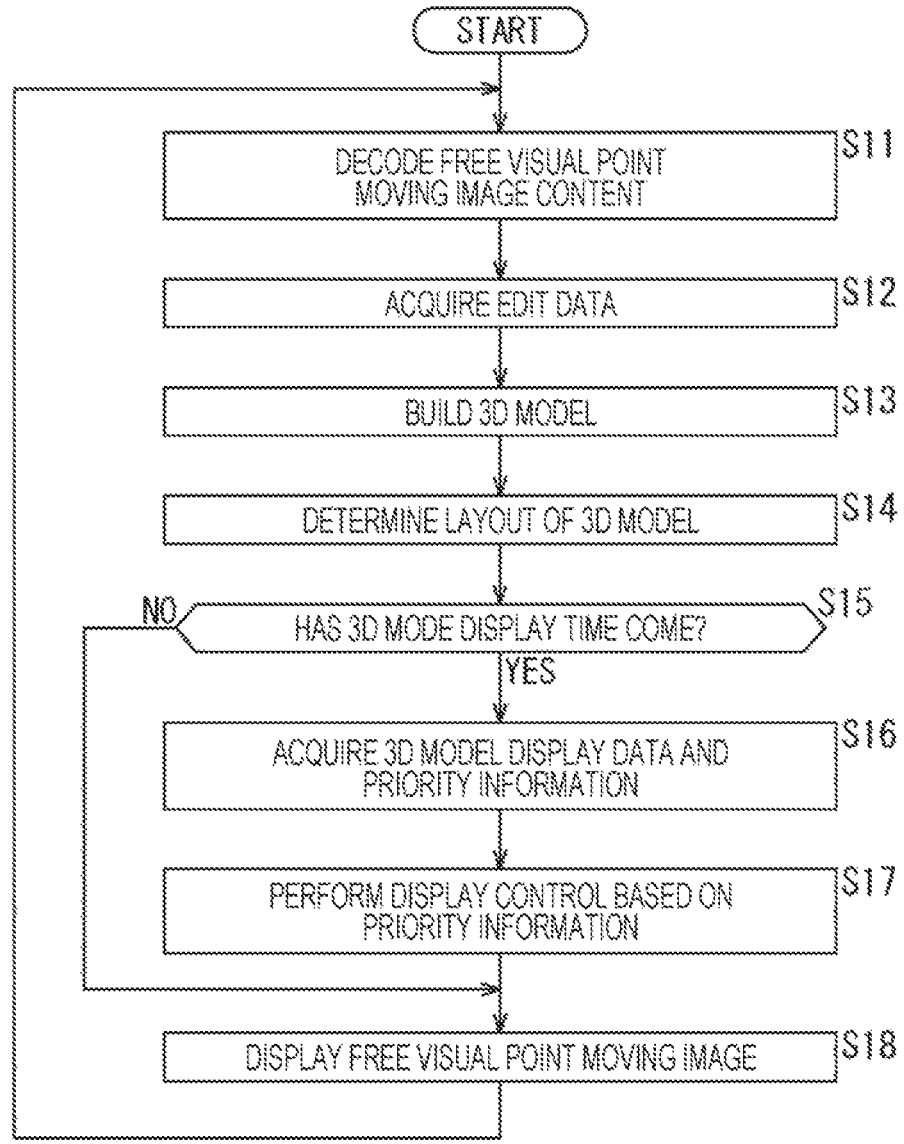

REPRODUCING DEVICE, REPRODUCING METHOD, RECORDING DEVICE, RECORDING METHOD, REPRODUCING/RECORDING DEVICE, AND REPRODUCING/RECORDING METHOD FOR DISPLAY OF A 3D MODEL ARRANGED IN A SPACE RECREATED BY A FREE VISUAL POINT MOVING IMAGE STREAM

CROSS REFERENCE TO RELATED APPLICATIONS

This application is a U.S. National Phase of International Patent Application No. PCT/JP2017/034238 filed on Sep. 22, 2017, which claims priority benefit of Japanese Patent Application No. JP 2016-198250 filed in the Japan Patent Office on Oct. 6, 2016. Each of the above-referenced applications is hereby incorporated herein by reference in its entirety.

TECHNICAL FIELD

The present disclosure relates to a reproducing device, a reproducing method, a recording device, a recording method, a reproducing/recording device, a reproducing/recording method, and a program, and more particularly relates to a reproducing device, a reproducing method, a recording device, a recording method, a reproducing/recording device, a reproducing/recording method, and a program capable of supporting more appropriate 3D model display.

BACKGROUND ART

Generally, moving image content such as user-generated contents (UGC) is distributed on a distribution site to which a user can upload a moving image, and moving image content such as a movie and a drama are distributed free or charged on a commercial distribution site. In the related art, most of the above-described moving image content is 2D moving image content in which an eye direction and a visual point position are fixed by camera work at the time of content generation.

In contrast, in recent years, it is possible to create moving image content in which an eye direction can be freely changed (hereinafter referred to as omni-directional moving image content). In the omni-directional moving image content, for example, an eye direction can be changed by utilizing a head-mounted display in accordance with a face direction, and therefore, higher reality feeling can be achieved, and wide use is expected in the future.

Furthermore, in the future, it is assumed that moving image content (hereinafter referred to as "free visual point moving image content") in which an eye direction can be changed in a manner similar to the omni-directional moving image content and the eye direction can be freely moved in a space recreated by a moving image is widely used.

For example, Patent Document 1 discloses a structure of metadata in which information associated with a size and a position of a moving image to be output, or the like can be edited as metadata associated with moving image data. Additionally, Patent Document 2 discloses a reproducing device capable of selecting a display format on the basis of playlist information including reproduction attribute information and the like, a stream information table that enables a display system in accordance with an age, and the like.

CITATION LIST

Patent Document

Patent Document 1: Japanese Patent Application Laid-Open No. 2006-14090
Patent Document 2: Japanese Patent Application Laid-Open No. 2012-213220

SUMMARY OF THE INVENTION

Problems to be Solved by the Invention

By the way, in a game and the like, a free visual point space where a 3D model is arranged is created by rendering an object and texture data. In free visual point moving image content as described above, it is possible to have data as a 3D model, different from 2D moving image content and omni-directional moving image content, however; the 3D model is not appropriately displayed in accordance with various situations.

The present disclosure is made in view of the above-described situation and is directed to enabling support for more appropriate 3D model display.

Solutions to Problems

A reproducing device according to a first aspect of the present disclosure includes: a reproduction processing unit adapted to reproduce free visual point moving image content including a free visual point moving image stream and an edit data stream; and a display control unit adapted to control, with reference to additional information set in edit data, display of a 3D model arranged in a space recreated by the free visual point moving image stream in accordance with basic information set in the edit data constituting the edit data stream.

A reproducing method or a program according to the first aspect of the present disclosure includes steps of: reproducing free visual point moving image content including a free visual point moving image stream and an edit data stream; and controlling, with reference to additional information set in edit data, display of a 3D model arranged in a space recreated by the free visual point moving image stream in accordance with basic information set in the edit data constituting the edit data stream.

According to the first aspect of the present disclosure, the free visual point moving image content including the free visual point moving image stream and the edit data stream is reproduced, and display of the 3D model arranged in the space recreated by the free visual point moving image stream in accordance with basic information set in the edit data constituting the edit data stream is controlled with reference to the additional information set in the edit data.

A recording device according to a second aspect of the present disclosure includes: an edit matter acquisition unit adapted to acquire an edit matter for additional information to be referred to at the time of controlling display of a 3D model arranged in a space recreated by a free visual point moving image stream in accordance with basic information set in edit data constituting an edit data stream of free visual point moving image content including the free visual point moving image stream and the edit data stream; an edit data setting unit adapted to edit the additional information of the edit data constituting the edit data stream in accordance with the edit matter acquired by the edit matter acquisition unit; and a recording processing unit adapted to record, as the free visual point moving image content in a recording unit, the edit data stream edited by the edit data setting unit and the free visual point moving image stream corresponding to the edit data stream.

A recording method or a program according the second aspect of the present disclosure includes steps of: acquiring an edit matter for additional information to be referred to at the time of controlling display of a 3D model arranged in a space recreated by a free visual point moving image stream in accordance with basic information set in edit data constituting an edit data stream of free visual point moving image content including the free visual point moving image stream and the edit data stream; editing, in accordance with the acquired edit matter, the additional information of the edit data constituting the edit data stream; and recording, as the free visual point moving image content in a recording unit, the edited edit data stream and the free visual point moving image stream corresponding to the edit data stream.

According to the second aspect of the present disclosure, the edit matter is acquired for the additional information to be referred to at the time of controlling display of the 3D model arranged in the space recreated by the free visual point moving image stream in accordance with the basic information set in the edit data constituting the edit data stream of the free visual point moving image content including the free visual point moving image stream and the edit data stream; the additional information of the edit data constituting the edit data stream is edited in accordance with the edit matter; and the edited edit data stream and the free visual point moving image stream corresponding to the edit data stream are recorded in the recording unit as the free visual point moving image content.

A reproducing/recording device according to a third aspect of the present disclosure includes: a reproduction processing unit adapted to reproduce free visual point moving image content including a free visual point moving image stream and an edit data stream; a display control unit adapted to control, with reference to additional information set in edit data, display of a 3D model arranged in a space recreated by the free visual point moving image stream in accordance with basic information set in the edit data constituting the edit data stream; an edit matter acquisition unit adapted to acquire an edit matter for additional information to be referred to at the time of controlling display of the 3D model arranged in the space recreated by the free visual point moving image stream in accordance with the basic information set in the edit data constituting the edit data stream of the free visual point moving image content including the free visual point moving image stream and the edit data stream; an edit data setting unit adapted to edit the additional information of the edit data constituting the edit data stream in accordance with the edit matter acquired by the edit matter acquisition unit; and a recording processing unit adapted to record, as the free visual point moving image content in a recording unit, the edit data stream edited by the edit data setting unit and the free visual point moving image stream corresponding to the edit data stream.

A reproducing/recording method or a program according the third aspect of the present disclosure includes steps of, at the time of reproducing free visual point moving image content: reproducing free visual point moving image content including a free visual point moving image stream and an edit data stream; and controlling, with reference to additional information set in edit data, display of a 3D model arranged in a space recreated by the free visual point moving image stream in accordance with basic information set in the edit data constituting the edit data stream, and the method or program further includes, at the time of recording the free visual point moving image content: acquiring an edit matter for the additional information to be referred to at the time of controlling display of the 3D model arranged in the space recreated by the free visual point moving image stream in accordance with the basic information set in the edit data constituting the edit data stream of the free visual point moving image content including the free visual point moving image stream and the edit data stream; editing, in accordance with the acquired edit matter, the additional information of the edit data constituting the edit data stream; and recording, as the free visual point moving image content in a recording unit, the edited edit data stream and the free visual point moving image stream corresponding to the edit data stream.

According to the third aspect of the present disclosure, when the free visual point moving image content is reproduced, the free visual point moving image content including the free visual point moving image stream and the edit data stream is reproduced, and display of the 3D model arranged in the space recreated by the free visual point moving image stream in accordance with the basic information set in the edit data constituting the edit data stream is controlled with reference to the additional information set in the edit data. On the other hand, when the free visual point moving image content is recorded, the edit matter is acquired for the additional information to be referred to at the time of controlling display of the 3D model arranged in the space recreated by the free visual point moving image stream in accordance with the basic information set in the edit data constituting the edit data stream of the free visual point moving image content including the free visual point moving image stream and the edit data stream; the additional information of the edit data constituting the edit data stream is edited in accordance with the edit matter; and the edited edit data stream and the free visual point moving image stream corresponding to the edit data stream are recorded in the recording unit as the free visual point moving image content.

Effects of the Invention

According to one aspect of the present disclosure, it is possible to support more appropriate 3D model display.

BRIEF DESCRIPTION OF DRAWINGS

FIG. 3 is a diagram illustrating examples of various kinds of information included in edit data.

FIG. 4 is a diagram illustrating an example of priority information.

FIG. 6 is a flowchart to describe reproduction processing to reproduce free visual point moving image content.

FIG. 7 is a diagram illustrating a modified example of the priority information.

MODE FOR CARRYING OUT THE INVENTION

In the following, a specific embodiment to which the present technology is applied will be described in detail with reference to the drawings.

Exemplary Configuration of Recording/Reproducing Device

Figure 1:
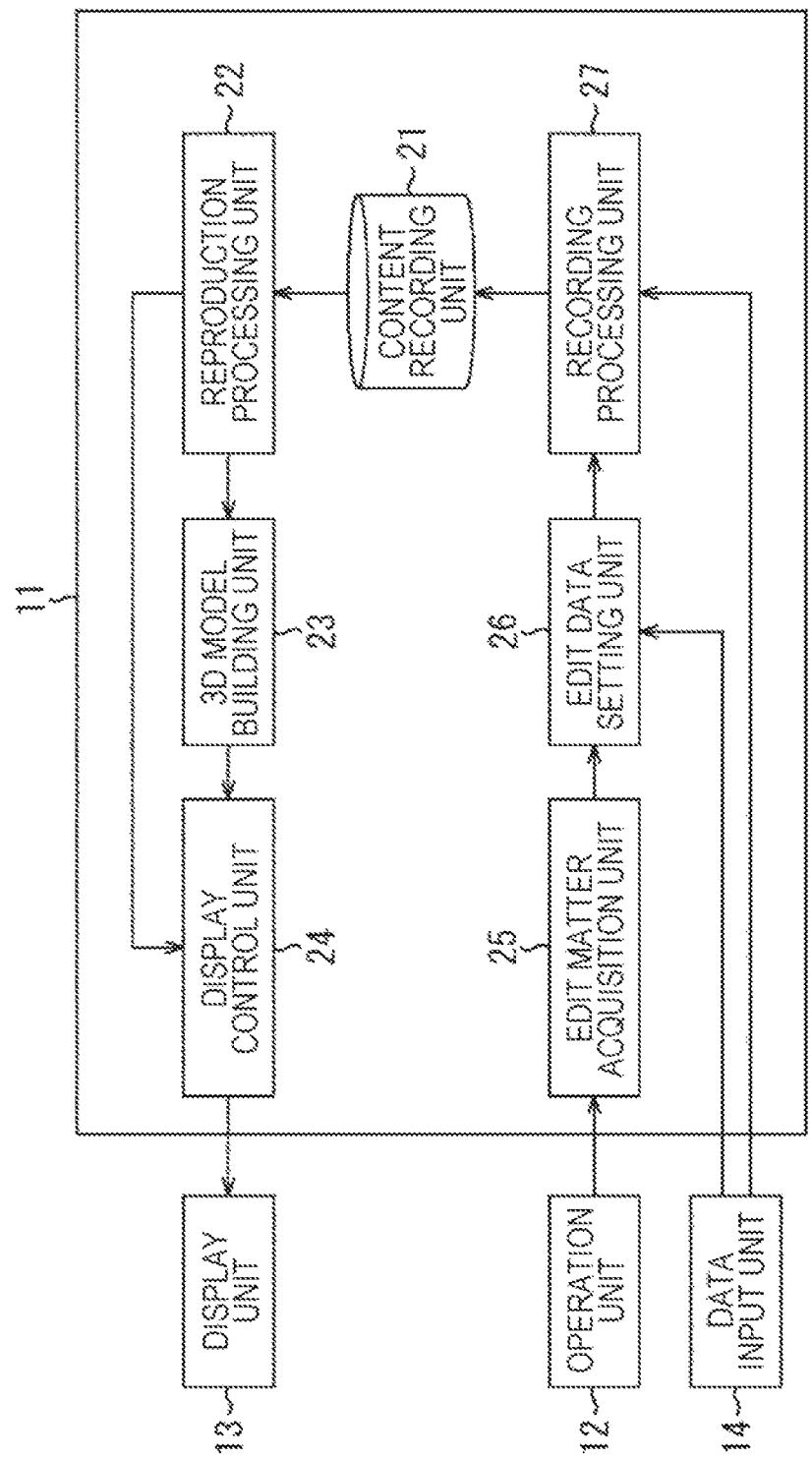
FIG. 1 is a block diagram illustrating an exemplary configuration of an embodiment of a recording/reproducing device.

FIG. 1 is a block diagram illustrating an exemplary configuration of one embodiment of a recording/reproducing device to which the present technology is applied.

As illustrated in FIG. 1, a recording/reproducing device 11 can be used by connecting an operation unit 12, a display unit 13, and a data input unit 14, and includes a content recording unit 21, a reproduction processing unit 22, a 3D model building unit 23, a display control unit 24, an edit matter acquisition unit 25, an edit data setting unit 26, and a recording processing unit 27. For example, the recording/reproducing device 11 can record and reproduce free visual point moving image content that can be spatially moved and can be viewed around in any arbitrary eye direction from various visual point positions.

The operation unit 12 supplies the recording/reproducing device 11 with various kinds of operation signals in accordance with operation by a user via, for example, wired or wireless communication like a remote controller. For example, the operation unit 12 supplies, in accordance with operation by the user, the recording/reproducing device 11 with: an operation signal to provide commands for an eye direction and a visual point position at the time of reproducing free visual point moving image content; an operation signal to provide a command for an edit matter at the time of recording the free visual point moving image content; and the like.

The display unit 13 displays moving image content to be reproduced by the recording/reproducing device 11. For example, when free visual point moving image content is reproduced by the recording/reproducing device 11, a free visual point moving image in an eye direction synchronized with a user's face direction is displayed on the display unit 13 from a visual point position synchronized with operation by the user.

The data input unit 14 performs input, to the recording/reproducing device 11, moving image content to be recorded and reproduced by the recording/reproducing device 11.

The content recording unit 21 records the moving image content received via the data input unit 14. For example, the content recording unit 21 records free visual point moving image content including a free visual point moving image stream and an edit data stream as described later with reference to FIG. 2.

The reproduction processing unit 22 reads the moving image content from the content recording unit 21 and decodes the same, and performs processing to reproduce the moving image content. Additionally, at the time of reproducing the free visual point moving image content, for example, the reproduction processing unit 22 supplies the 3D model building unit 23 with the edit data stream constituting free visual point moving image content and further supplies the display control unit 24 with the free visual point moving image stream constituting the free visual point moving image content.

Figure 2:
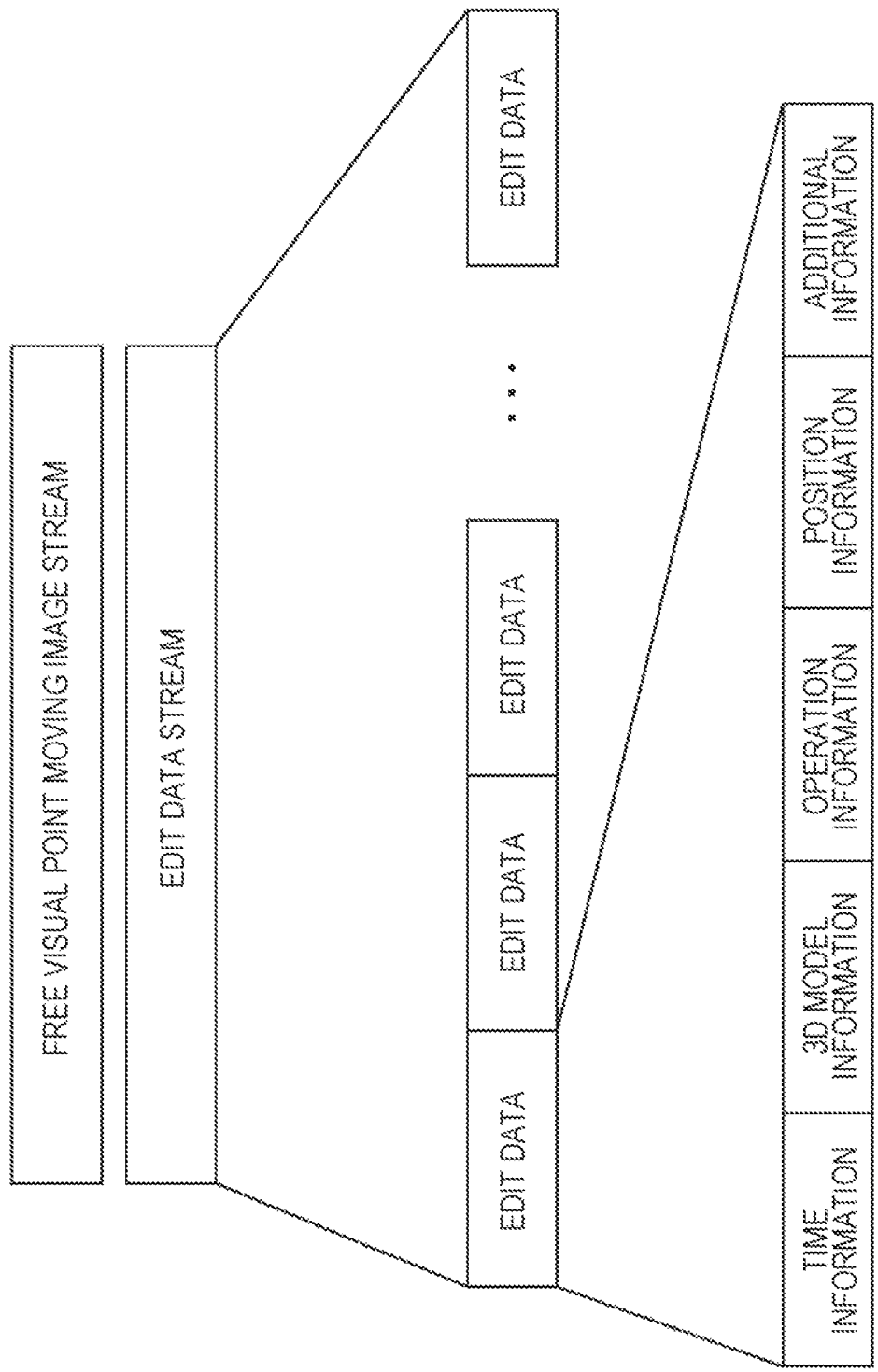
FIG. 2 is a diagram illustrating an exemplary data structure of free visual point moving image content.

The 3D model building unit 23 builds a 3D model arranged in a space recreated by the free visual point moving image stream reproduced in the recording/reproducing device 11 in accordance with basic information (e.g., 3D model information, operation information, and position information illustrated in FIG. 2) set in edit data constituting the edit data stream supplied from the reproduction processing unit 22. For example, the 3D model building unit 23 builds a 3D model in accordance with a preset object and texture, generates 3D model display data in order to provide a layout of the 3D model in a preset size, at a preset arrangement position, and the like, and supplies the display control unit 24 with the generated 3D model display data.

The display control unit 24 performs display control such that the 3D model built in the 3D model building unit 23 is arranged in the prescribed layout in a space represented by an omni-directional moving image recreated in accordance with the free visual point moving image stream supplied from the reproduction processing unit 22. Then, the display control unit 24 supplies the display unit 13 with the free visual point moving image that can be viewed from an eye direction and a visual point position conforming to operation by the user, and causes the display unit 13 to display the free visual point moving image. Additionally, the display control unit 24 refers to additional information set in the edit data and performs display control for a 3D model as described later.

At the time of recording the free visual point moving image content in the recording/reproducing device 11, the edit matter acquisition unit 25 acquires an edit matter for the free visual point moving image content on the basis of an operation signal supplied from the operation unit 12 in accordance with operation by the user, and supplies the edit data setting unit 26 with the acquired edit matter. Note that, for example, the edit matter acquisition unit 25 may also acquire an edit matter for free visual point moving image content that has been already recorded in the content recording unit 21.

At the time of recording the free visual point moving image content in the recording/reproducing device 11, the edit data stream constituting the free visual point moving image content is received in the edit data setting unit 26 via the data input unit 14. Then, the edit data setting unit 26 performs setting (editing) for the edit data constituting the edit data stream in accordance with the edit matter supplied from the edit matter acquisition unit 25, and supplies the recording processing unit 27 with the edit data stream. For example, the edit data setting unit 26 edits priority information, viewing age restriction information, and the like as described later as additional information set in the edit data.

The recording processing unit 27 performs processing to encode the moving image content to be recorded in the content recording unit 21 and supply the content recording unit 21 with the encoded content. For example, at the time of recording the free visual point moving image content on the recording/reproducing device 11, the free visual point moving image stream constituting free visual point moving image content is received in the recording processing unit 27 via the data input unit 14. Then, the recording processing unit 27 encodes the free visual point moving image stream and the edit data stream supplied from the edit data setting unit 26, and record the encoded streams in the content recording unit 21 as the free visual point moving image content.

The recording/reproducing device 11 having the above-described configuration performs, for the 3D model built by the 3D model building unit 23, display control with reference to the additional information set in the edit data in the display control unit 24, for example, at the time of reproducing the free visual point moving image content. With this display control, the recording/reproducing device 11 can support 3D display model in accordance with setting (editing) of the additional information more appropriately than in the related art.

<Data Structure of Free Visual Point Moving Image Content>

A data structure of free visual point moving image content to be reproduced in the recording/reproducing device 11 will be described with reference to FIGS. 2 and 3.

As illustrated in FIG. 2, for example, free visual point moving image content includes: a free visual point moving image stream used to reproduce an omni-directional moving image representing a space in which an eye direction can be freely changed and a visual point position can be freely moved; and an edit data stream used to apply edit for a 3D model without altering original data.

Additionally, in a case where a plurality of 3D models can be edited in the free visual point moving image content, the edit data stream includes aggregation of pieces of edit data for the respective 3D models as illustrated in FIG. 2. Generally, moving image data is encoded, and it is necessary to once decode the moving image data, subsequently edit the decoded data, and then encode the edited data again in order to edit a part of the moving image data, and therefore, the edit data is used to perform suitable editing without altering original moving image data, for example. Consequently, partial editing of the moving image data can be easily performed.

The edit data includes information set for an editable 3D model arranged in a space recreated in the free visual point moving image content, and holds time information, 3D model information, operation information, position information, and additional information.

FIG. 3 illustrates exemplary information held by the edit data.

In the time information, for example, start time to start displaying a 3D model and finish time to finish displaying the 3D model are set as information indicating a display period of the 3D model.

In the 3D model information, for example, data of a 3D model itself (in other words, an object representing a shape of the 3D model and texture representing texture of a surface of the 3D model), an ID to identify the 3D model, and the like are set as information indicating the 3D model.

In the operation information, for example, rotation of a 3D model, enlargement or reduction of the 3D model, erasing of the 3D model, transparency of the 3D model, and the like are set as information indicating operation for the 3D model.

In the position information, for example, coordinates of a 3D model or the like are set as information indicating a position of the 3D model in the space.

In the additional information, for example, priority information, viewing age restriction information, and the like are set as the additional information to be referred to at the time of displaying an editable 3D model arranged in the space recreated in the free visual point moving image content, for example.

The priority information is information used to uniquely display a plurality of 3D models and can be set by using numerical values as illustrated in FIG. 4, for example. The example illustrated in FIG. 4 indicates that: the larger a numerical value of the priority information is, the higher the priority is; and the smaller the numerical value of the priority information is, the lower the priority is. For example, when a plurality of 3D models is arranged in accordance with the edit data, and in a case of having a layout in which surfaces of some 3D models coincide with each other, display is controlled such that a surface of a 3D model having higher priority is displayed on a front side and a surface of a 3D model having lower priority is located on a back side.

Meanwhile, the priority information of an existing 3D model in the space recreated in the free visual point moving image content is set to 0. Additionally, in a case where the numerical values of the priority information are the same in the plurality of 3D models, which one of the 3D models is preferentially displayed is not determined in the priority information.

The recording/reproducing device 11 can appropriately control display of a 3D model arranged in the space recreated in the free visual point moving image content by using the edit data having the above-described data structure. In other words, the recording/reproducing device 11 can easily perform editing work by editing an edit data stream provided separately from a free visual point moving image stream without directly changing the free visual point moving image stream. Additionally, the recording/reproducing device 11 can appropriately display a 3D model in accordance with various situations by having the data structure in which the priority information is added together with time information, 3D model information, operation information, and position information.

The display control for a 3D model, in which the priority information is referred to, will be described with reference to FIGS. 5A and 5B.

Figure 5A:
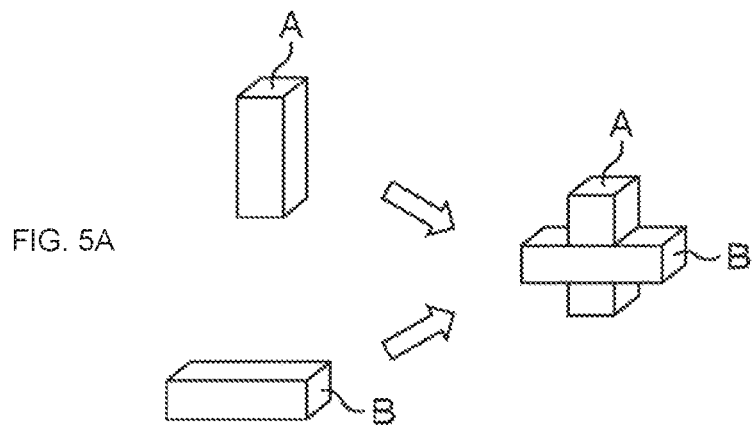
FIGS. 5A and 5B are views to describe display control for a 3D model with reference to the priority information.
Figure 5B:
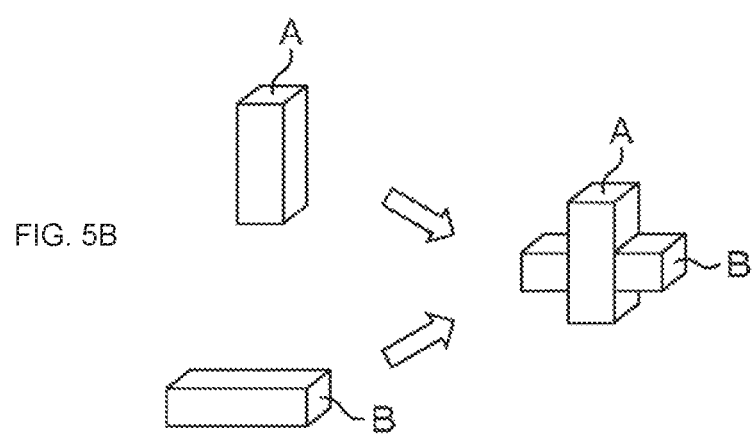

For example, the description will be provided for an example of having a layout in which a surface of a 3D model A and a surface of the 3D model B coincide with each other as a result of editing arrangement positions of the 3D model A and 3D model B as illustrated in FIGS. 5A and 5B. Meanwhile, in a case where the priority information is not used, which one of the surface of the 3D model A or the surface of the 3D model B is displayed on the front side cannot be uniquely determined.

In contrast, for example, in a case where priority of the 3D model A is set to 1 and priority of the 3D model B is set to 4, the display control unit 24 refers to the respective priority information, and performs display control such that the surface of the 3D model B is displayed on the front side as illustrated in FIG. 5A.

Additionally, for example, assume that the priority information of the 3D model B is set to −1 when the existing 3D model A exists in the space recreated in the free visual point moving image content. In this case, the priority information of the existing 3D model A is 0, and the display control unit 24 refers to the respective priority information, and can perform display control such that the surface of the 3D model A is displayed on the front side as illustrated in FIG. 5B.

Thus, since the display control unit 24 refers to the priority information represented by the numerical values as illustrated in FIG. 4, it is possible to appropriately display the respective 3D models even in a situation in which the surfaces of the plurality of 3D models coincide with each other. Here, since the priority information is represented by a numerical value and the priority information of the existing 3D model is set to 0, display control based on a relation with the 3D model already arranged in the space can be appropriately performed.

<Reproduction Processing for Free Visual Point Moving Image Content>

Next, FIG. 6 is a flowchart to describe reproduction processing to reproduce free visual point moving image content. For example, free visual point moving image content to be reproduced is selected by a user, and the reproduction processing is started when operation to provide a command for reproduction is performed.

In step S11, the reproduction processing unit 22 reads free visual point moving image content to be reproduced from the content recording unit 21 in accordance with operation by the user, and decodes the free visual point moving image content. Then, the reproduction processing unit 22 supplies the 3D model building unit 23 with an edit data stream, and further supplies the display control unit 24 with a free visual point moving image stream in accordance with reproduction time of the free visual point moving image content.

In step S12, the 3D model building unit 23 sequentially acquires edit data from a head of the edit data stream supplied from the reproduction processing unit 22.

In step S13, the 3D model building unit 23 builds a 3D model based on an object and texture in accordance with 3D model information of the edit data acquired in step S12.

In step S14, the 3D model building unit 23 determines a layout including a size, an arrangement position, and the like of the 3D model built in step S13 in accordance with operation information and position information of the edit data acquired in step S12, and generates 3D model display data to display the 3D model.

In step S15, the 3D model building unit 23 determines whether or not the reproduction time of the free visual point moving image content has reached display time to display the 3D model in accordance with time information of the edit data of the 3D model for which the 3D model display data has been already generated.

In step S15, in a case where the 3D model building unit 23 determines that the reproduction time of the free visual point moving image content has not yet reached the display time to display the 3D model, the processing skips steps S16 and S17 and proceeds to step S18. In other words, in this case, the 3D model for which the 3D model display data has been already generated is not displayed in step S14 immediately before, and displaying is made to wait until the display time of the 3D model has come.

On the other hand, in step S15, in a case where the 3D model building unit 23 determines that the reproduction time of the free visual point moving image content has reached the display time to display the 3D model, the processing proceeds to step S16.

In step S16, the 3D model building unit 23 supplies the display control unit 24 with priority information set in the edit data of the 3D model together with the 3D model display data of the 3D model for which it is determined that the display time has come. Consequently, the display control unit 24 acquires the 3D model display data and the priority information.

In step S17, the display control unit 24 refers to the priority information acquired in step S16 and performs display control for the 3D model based on the 3D model display data. In other words, for example, in a case where the surface of the 3D model for which it is determined that the display time has come coincides with a surface of another 3D model that is already arranged, the display control unit 24 refers to the respective pieces of the priority information and performs display control such that the surface of the 3D model having higher priority is displayed on the front side.

In step S18, the display control unit 24 generates a free visual point moving image on the basis of the free visual point moving image stream supplied from the reproduction processing unit 22 in step S11, and supplies the display unit 13 with this free visual point moving image to cause the display unit to display the same. At this point, the display control unit 24 generates, in accordance with the 3D model display data, a free visual point moving image in which the 3D model for which it is determined in step S15 that the display time has come is newly arranged. Meanwhile, in a case where there is no 3D model for which it is determined in step S15 that the display time has come, the display control unit 24 generates a free visual point moving image including no 3D model newly arranged.

After the processing of step S18, the processing returns to step S11, and the similar processing is repeatedly performed until reproduction of the free visual point moving image content is completed.

As described above, the recording/reproducing device 11 can appropriately perform 3D model display by the reproduction processing to perform display control for the 3D model with reference to the priority information.

Modified Example of Priority Information

A modified example of the priority information will be described with reference to FIG. 7.

For example, the priority information may be set not only by using the numerical values as illustrated in FIG. 4 described above but also by using 1-bit value for comparison with a 3D model already arranged at display time of a 3D model newly arranged.

In other words, in a case where the 1-bit priority information is 0 as illustrated in FIG. 7, the newly-arranged 3D model is more prioritized than the existing 3D model and designated to be displayed on the front side. Additionally, in a case where the 1-bit priority information is 1, the newly-arranged 3D model is less prioritized than the existing 3D model and designated to be displayed on the back side. Therefore, the display control unit 24 can perform display control for the 3D models on the basis of the order to display the 3D models and relative priority with the 3D model that has been displayed till then.

For example, the description will be provided with reference to FIGS. 5A and 5B described above. For example, in the case where the 3D model A is displayed first and the 3D model B is displayed afterward, when the priority information of the 3D model B is set to 0, the display control unit 24 performs display control such that the surface of the 3D model B is displayed on the front side as illustrated in FIG. 5A.

Additionally, for example, in the case where the existing 3D model A exists in the space recreated in the free visual point moving image content, when the priority information of the 3D model B is set to 1, the display control unit 24 performs display control such that the surface of the 3D model A is displayed on the front side as illustrated in FIG. 5B.

Thus, a data amount can be reduced by representing the priority information using 1 bit, and furthermore, display control for a display of the 3D model can be easily performed on the basis of the relative priority with the existing 3D model. Therefore, it is preferable to apply the 1-bit priority information to free visual point moving image content in which 3D models do not exist in a complex manner.

The reproduction processing using the priority information represented by the above-described 1-bit value will be described with reference to a flowchart of FIG. 8.

Figure 8:
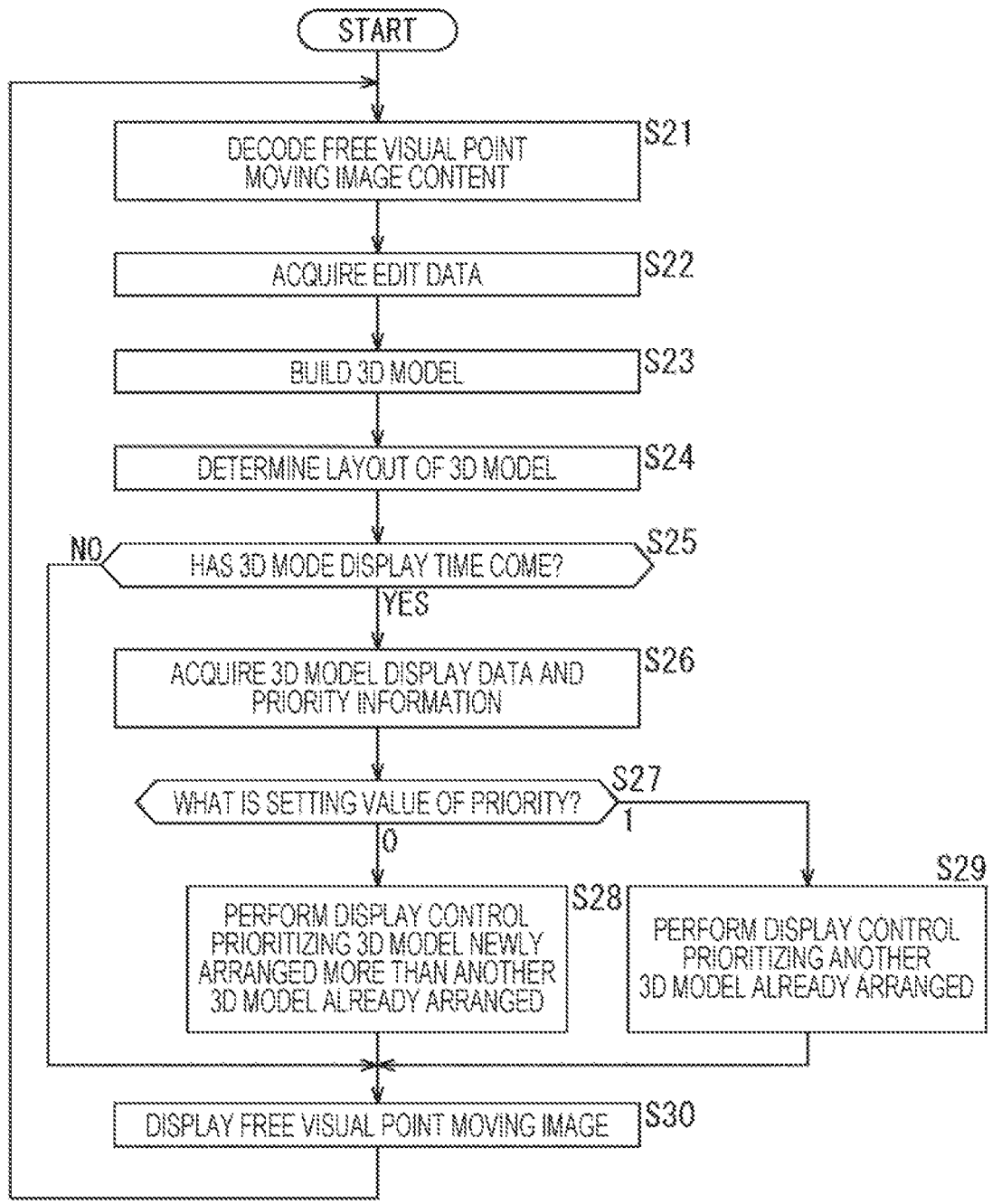
FIG. 8 is a flowchart to describe the reproduction processing using 1-bit priority information.

The processing from step S21 to step S26 illustrated in the flowchart of FIG. 8 is performed in a manner similar to the processing from step S11 to step S16 in the flowchart described above with reference to FIG. 6.

In step S27, the display control unit 24 determines which one of 1 or 0 the 1-bit priority information acquired in step S26 is.

In step S27, in a case where the display control unit 24 determines that the 1-bit priority information is 0, the processing proceeds to step S28. In step S28, in a case where a surface of a 3D model for which it is determined in step S25 that display time has come coincides with a surface of another 3D model already arranged, the display control unit 24 performs display control such that a 3D model newly arranged is prioritized and a surface of the new 3D model is displayed on the front side.

On the other hand, in step S27, in a case where the display control unit 24 determines that the 1-bit priority information is 1, the processing proceeds to step S29. In step S29, in a case where a surface of a 3D model for which it is determined in step S25 that the display time has come coincides with a surface of the other 3D model already arranged, the display control unit 24 performs display control such that display of the other 3D model is prioritized and a surface of the other 3D model is displayed on the front side. In other words, in this case, the surface of the 3D model newly arranged is displayed on the back side.

After the processing of step S28 or S29, the processing proceeds to step S30, and the processing similar to that of step S18 in the flowchart of FIG. 6 is performed. After that, the processing returns to step S21, and the similar processing is repeatedly performed until reproduction of the free visual point moving image content is completed.

As described above, the recording/reproducing device 11 can appropriately perform display of the 3D models by the reproduction processing in which display control for the 3D models is performed with reference to the priority information represented by the 1-bit value.

Another Example of Additional Information

By the way, as for the additional information, it is possible to set various kinds of information to be referred to at the time of displaying 3D models arranged in a space recreated in free visual point moving image content, besides the priority information as described above.

Figure 9:
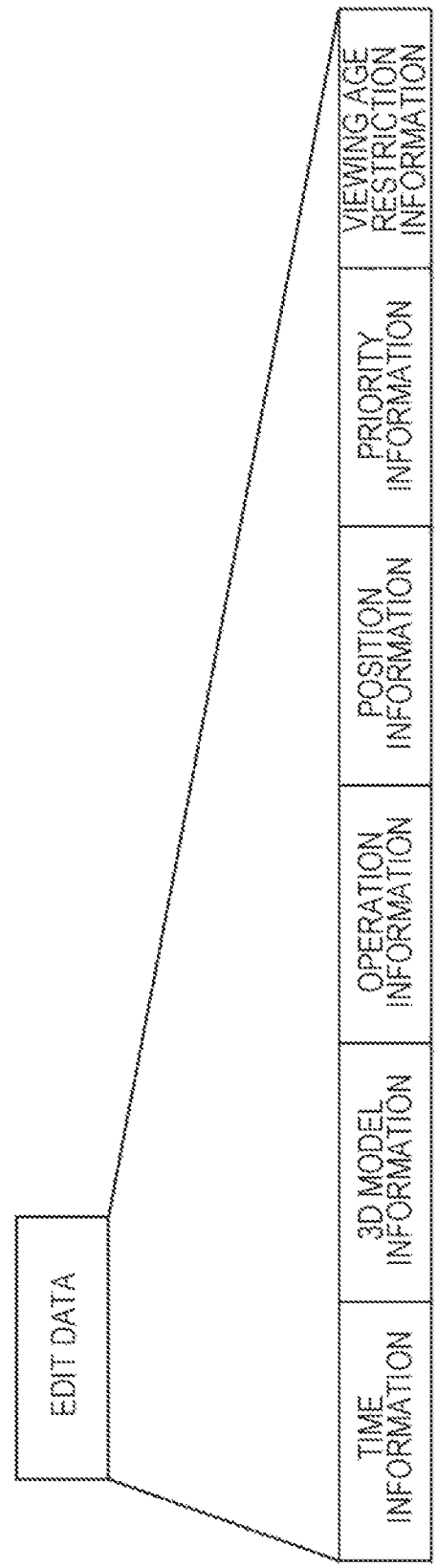
FIG. 9 is a diagram illustrating edit data to which viewing age restriction information is added.

For example, as illustrated in FIG. 9, it is possible to set, as the additional information, viewing age restriction information in order to provide viewing age restriction for each 3D model, in addition to the priority information. For example, since time information is set in edit data and the viewing age restriction information is further set as the additional information, a part of the free visual point moving image content can be displayed or not displayed in accordance with the viewing age restriction information.

For example, in a case where viewing age restriction information set in edit data is equal to or younger than viewing age restriction information preset in the recording/reproducing device 11, the display control unit 24 performs display control so as to display a 3D model of the edit data. Additionally, in a case where no viewing age restriction information is set in edit data, the display control unit 24 performs display control so as to constantly display the 3D model of the edit data.

Here, the viewing age restriction information includes numerical information of a minimum age of a user who is allowed to view content, and for example, in a case where the numerical value information is set to 20, a person having the age of 20 years old or older is allowed to view the content. Additionally, in edit data in which the viewing age restriction information is set, it is possible to use the above-described priority information in the case of use (of updating) in which new data is more preferentially displayed than existing data. For example, in a case of using the priority information set with the numerical values as illustrated in FIG. 4, a value larger than 0 is set in the priority information. Furthermore, a plurality of pieces of viewing age restriction information may be set for each edit data, and for example, it is possible to perform display control in which data of the oldest age is most prioritized by setting higher priority for the older age. Additionally, in the case of using the 1-bit priority information as illustrated in FIG. 7, it is possible to perform appropriate display control by setting 0 for the priority information and storing pieces of edit data in an edit data stream in the order in which the age becomes older.

The reproduction processing using such viewing age restriction information will be described with reference to a flowchart of FIG. 10.

Figure 10:
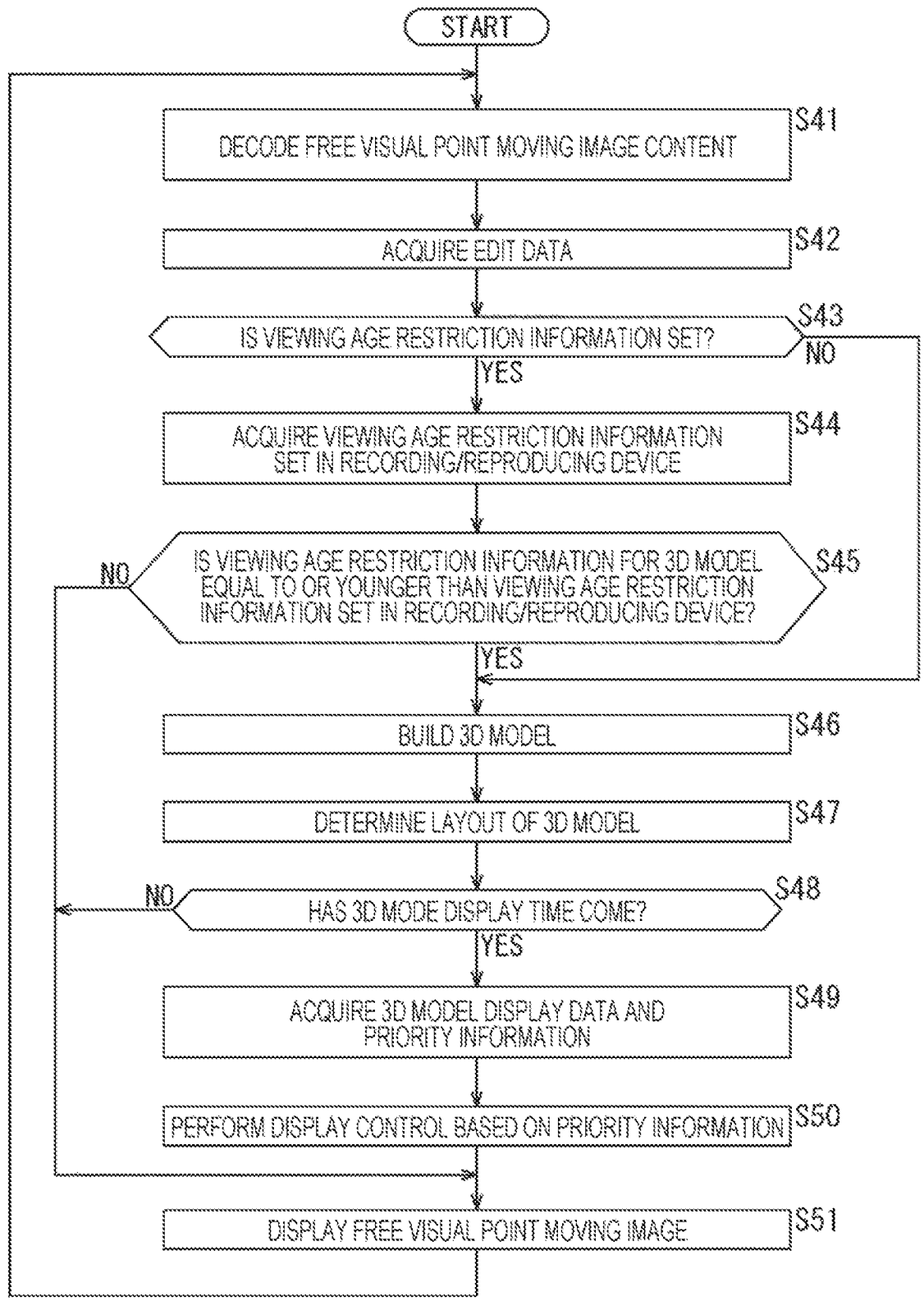
FIG. 10 is a flowchart illustrating reproduction processing using the viewing age restriction information.

The processing of step S41 and step S42 illustrated in the flowchart of FIG. 10 is performed in a manner similar to the processing of step S11 and step S12 in the flowchart of the above-described reproduction processing with reference to FIG. 6.

In step S43, the 3D model building unit 23 determines whether or not viewing age restriction information is set for a 3D model of edit data acquired in step S42.

In step S43, in a case where the 3D model building unit 23 determines that the viewing age restriction information is set, the processing proceeds to step S44.

In step S44, the 3D model building unit 23 reads and acquires the viewing age restriction information set in the recording/reproducing device 11 from, for example, a memory that stores various kinds of settings for the recording/reproducing device 11.

In step S45, the 3D model building unit 23 determines whether or not the viewing age restriction information set for the 3D model of the edit data is equal to or younger than the viewing age restriction information acquired from the recording/reproducing device 11.

In step S45, in a case where the 3D model building unit 23 determines that the viewing age restriction information for the 3D model is not equal to or younger than the viewing age restriction information in the recording/reproducing device 11, the processing skips steps S46 to S50 and proceeds to step S51. In other words, in this case, it can be determined that displaying the 3D model is not suitable in the recording/reproducing device 11, and 3D model display data of the 3D model is not generated.

On the other hand, in a case where the 3D model building unit 23 determines that the viewing age restriction information of the 3D model is equal to or younger than the age limitation information in the recording/reproducing device 11, it can be determined that displaying the 3D model in the recording/reproducing device 11 is suitable and the processing proceeds to step S46. Also, in step S43, in a case where the 3D model building unit 23 determines that the viewing age restriction information is not set, the processing also proceeds to step S46.

The processing from step S46 to step S51 is performed in a manner similar to the processing from step S13 to step S18 in the flowchart described above with reference to FIG. 6. After that, the processing returns to step S41, and the similar processing is repeatedly performed until reproduction of the free visual point moving image content is completed.

As described above, the recording/reproducing device 11 can appropriately perform display of a 3D model by the reproduction processing in which display control for a 3D model is performed with reference to the viewing age restriction information. In other words, the recording/reproducing device 11 can apply viewing age restriction to only some of 3D models constituting free visual point moving image content, and it is possible to perform display control for the 3D models in accordance with the viewing age restriction information set in the recording/reproducing device 11.

Meanwhile, for example, the viewing age restriction information is not limited to application to video data of free visual point moving image content, but can also be applied to audio data, for example. In other words, in the free visual point moving image content, the audio data corresponding to the video data is also converted into objects and arranged in a space recreated in the free visual point moving image content in a manner similar to the 3D model. Therefore, audio output control in accordance with the viewing age restriction information can be performed by adding the viewing age restriction information to each piece of the audio data in edit data constituting an audio edit data stream corresponding to an audio data stream. Consequently, for example, the recording/reproducing device 11 can output sound only in a case where the viewing age restriction information of the audio data is equal to or younger than the viewing age restriction information set in the recording/reproducing device 11.

As described above, the recording/reproducing device 11 can perform display control with reference to the additional information set in the edit data and can transmit, for example, an edit data stream indicating that a different 3D model is arranged in a manner superimposed on a specific 3D model. Consequently, in the recording/reproducing device 11, surfaces of some of 3D models can be replaced with advertisements, for example, or a surface can be recreated differently between the present time and the past (for example, indicating a state in which a building is rebuilt). Additionally, the recording/reproducing device 11 can easily compare states before and after editing edit data.

Furthermore, as for free visual point moving image content for which the age restriction is set for the entire content for the reason of partial inconvenience, the recording/reproducing device 11 can set age restriction for only such an inconvenient part, and it is possible to avoid restricting reproduction of the entire free visual point moving image content. Consequently, it is possible to provide free visual point moving image content that can be experienced in a wide age range by utilizing the recording/reproducing device 11. Additionally, as for audio data also, the recording/reproducing device 11 can apply the age restriction to only a part of the sound.

<Recording Processing for Free Visual Point Moving Image Content>

Figure 11:
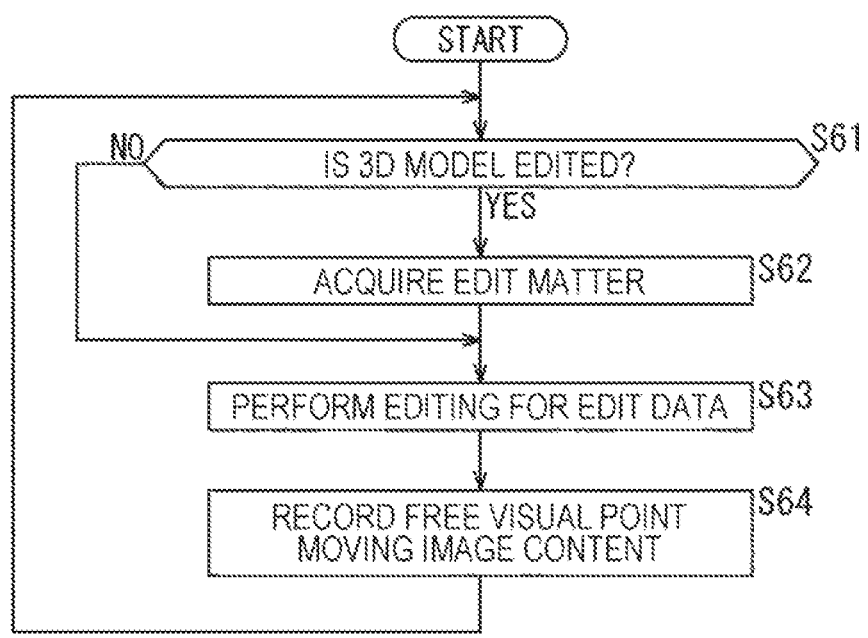
FIG. 11 is a flowchart illustrating recording processing to record free visual point moving image content.

Next, FIG. 11 is a flowchart illustrating recording processing to record free visual point moving image content. For example, the recording processing is started when free visual point moving image content to be recorded in the recording/reproducing device 11 is received in the data input unit 14 in accordance with operation by a user.

In step S61, the edit matter acquisition unit 25 determines whether or not a 3D model constituting the free visual point moving image content is edited. For example, when the user edits a predetermined 3D model by operating the operation unit 12 and an operation signal in accordance with the operation is supplied from the operation unit 12, the edit matter acquisition unit 25 determines that the 3D model is edited.

In step S61, in a case where the edit matter acquisition unit 25 determines that the 3D model constituting the free visual point moving image content is edited, the processing proceeds to step S62. In step S62, the edit matter acquisition unit 25 acquires the edit matter performed by the user for the 3D model constituting the free visual point moving image content on the basis of the operation signal supplied from the operation unit 12, and outputs the edit matter to the edit data setting unit 26. For example, the edit matter acquisition unit 25 acquires the edit matter for additional information and supplies the same to the edit data setting unit 26.

On the other hand, in a case where the edit matter acquisition unit 25 determines in step S61 that the 3D model constituting the free visual point moving image content is not edited, the processing skips step S62 and proceeds to step S63.

In step S63, the edit data setting unit 26 sequentially acquires edit data from a head of an edit data stream received via the data input unit 14. Then, the edit data setting unit 26 edits, in accordance with the edit matter, the edit data corresponding to a 3D model for which the edit matter is supplied from the edit matter acquisition unit 25, and supplies the edited edit data to the recording processing unit 27. For example, the edit data setting unit 26 edits additional information of the edit data and supplies the recording processing unit 27 with the edited additional information. Meanwhile, the edit data setting unit 26 directly supplies the recording processing unit 27 with edit data corresponding to a 3D model for which no edit matter is supplied from the edit matter acquisition unit 25.

In step S64, the recording processing unit 27 encodes: the edit data stream including the edit data supplied from the edit data setting unit 26 in step S63; and a free visual point moving image stream corresponding to the edit data stream and received via the data input unit 14, and then the recording processing unit records the encoded streams in the content recording unit 21 as the free visual point moving image content.

After the processing of step S64, the processing returns to step S61, and the similar processing is repeated until receipt of all of the free visual point moving image streams and edit data streams constituting the free visual point moving image content is completed.

As described above, the recording/reproducing device 11 can reflect, on an edit data stream, editing performed for a 3D model by a user without changing data of a free visual point moving image stream, and can record free visual point moving image content.

Note that, in the present embodiment, the recording/reproducing device 11 capable of performing both the reproduction processing and the recording processing for free visual point moving image content has been described, but the reproducing device and the recording device may also be independently configured, for example.

Note that the respective processing described with reference to the above-described flowcharts may not be necessarily chronologically performed in accordance with the order described in the flowcharts, and may further include processing executed in parallel or individually (e.g., parallel processing or processing by an object). Additionally, a program may be processed by one CPU or may be processed in a distributed manner by a plurality of CPUs.

Furthermore, the above-described series of processing (reproducing method) can be executed by hardware and further can be executed by software. In the case where the series of processing is executed by software, a program constituting the software is installed, from a program recording medium in which the program is recorded, in a computer incorporated in exclusive hardware or a general purpose personal computer capable of executing various functions by installing various programs, or the like, for example.

Figure 12:
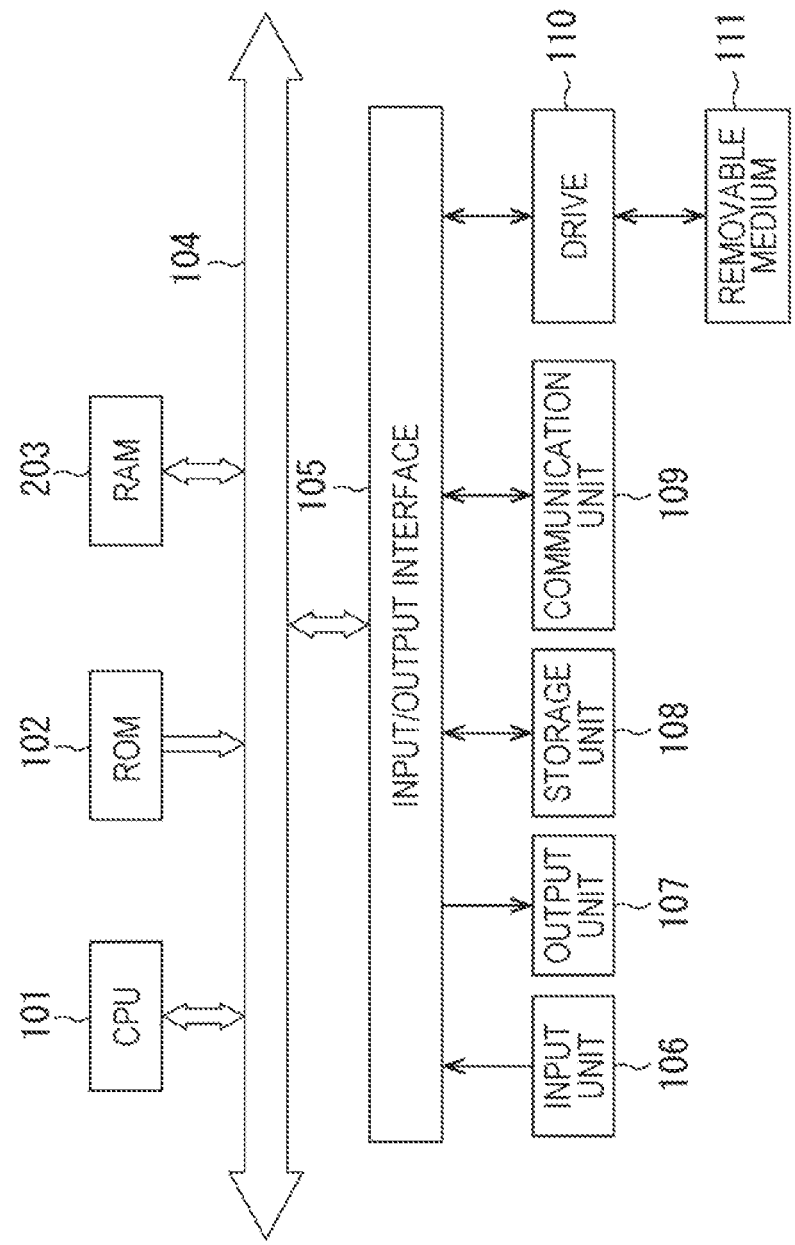
FIG. 12 is a block diagram illustrating an exemplary configuration of an embodiment of a computer to which the present technology is applied.

FIG. 12 is a block diagram illustrating an exemplary hardware configuration of a computer that executes the above-described series of processing with a program.

A central processing unit (CPU) 101, a read only memory (ROM) 102, and a random access memory (RAM) 103 are mutually connected via a bus 104 in the computer.

An input/output interface 105 is further connected to the bus 104. The input/output interface 105 is connected to: an input unit 106 including a keyboard, a mouse, a microphone, and the like; an output unit 107 including a display, a speaker, and the like; a storage unit 108 including a hard disk, a nonvolatile memory, and the like; a communication unit 109 including a network interface and the like; and a drive 110 to drive a removable medium 111 such as a magnetic disk, an optical disk, a magneto-optical disk, and a semiconductor memory.

In the computer having the above-described configuration, the above-described series of processing is performed by, for example, the CPU 101 loading, in the RAM 103, a program stored in the storage unit 108 via the input/output interface 105 and the bus 104, and executing the program.

The program executed by the computer (CPU 101) is, for example, provided by being recorded in the removable medium 111 that is a package medium including a magnetic disc (including a flexible disk), an optical disc (a compact disc-read only memory (CD-ROM), a digital versatile disc (DVD), or the like), a magneto-optical disk, a semiconductor memory, or the like, or alternatively the program is provided via a wired or wireless transmission media such as a local area network, the Internet, and a digital satellite broadcast.

Then, the program can be installed in the storage unit 108 via the input/output interface 105 by attaching the removable medium 111 to the drive 110. Additionally, the program can be received in the communication unit 109 via a wired or wireless transmission media and installed in the storage unit 108. Besides, the program can be preliminarily installed in the ROM 102 or the storage unit 108.

Note that the present technology may also adopt the following configurations.

(1)

A reproducing device including:

a reproduction processing unit adapted to reproduce free visual point moving image content including a free visual point moving image stream and an edit data stream; and a display control unit adapted to control, with reference to additional information set in edit data, display of a 3D model arranged in a space recreated by the free visual point moving image stream in accordance with basic information set in the edit data constituting the edit data stream.

(2)

The reproducing device recited in (1) above, in which the additional information is priority information indicating priority of display of the 3D model, and the display control unit refers to the priority information and performs display control such that the 3D model set at higher priority is preferentially displayed.

(3)

The reproducing device recited in (2) above, in which in a case where surfaces of a plurality of 3D models coincide with each other, the display control unit refers to the priority information and performs display control such that a surface of the 3D model set at higher priority is displayed on a front side.

(4)

The reproducing device recited in (2) or (3) above, in which the priority information sets priority of the 3D model to be newly arranged as a 1-bit value representing priority relatively to another 3D model already arranged.

(5)

The reproducing device recited in any one of above (1) to (4), in which the additional information is viewing age restriction information indicating an age to restrict display of the 3D model, and in a case where the viewing age restriction information set in the edit data is equal to or younger than the viewing age restriction information preset in the reproducing device, the display control unit performs display control so as to display the 3D model corresponding to the edit data.

(6)

The reproducing device recited in (5) above, in which the free visual point moving image content includes an audio data stream and an audio edit data stream, and output of audio data corresponding to edit data is controlled in accordance with the viewing age restriction information set in the edit data constituting the audio edit data.

(7)

A reproducing method including steps of:

reproducing free visual point moving image content including a free visual point moving image stream and an edit data stream; and controlling, with reference to additional information set in edit data, display of a 3D model arranged in a space recreated by the free visual point moving image stream in accordance with basic information set in the edit data constituting the edit data stream.

(8)

A program causing a computer to execute reproduction processing including steps of:

reproducing free visual point moving image content including a free visual point moving image stream and an edit data stream; and controlling, with reference to additional information set in edit data, display of a 3D model arranged in a space recreated by the free visual point moving image stream in accordance with basic information set in the edit data constituting the edit data stream.

(9)

A recording device including:

an edit matter acquisition unit adapted to acquire an edit matter for additional information to be referred to at the time of controlling display of a 3D model arranged in a space recreated by a free visual point moving image stream in accordance with basic information set in edit data constituting an edit data stream of free visual point moving image content including the free visual point moving image stream and the edit data stream;

an edit data setting unit adapted to edit the additional information of the edit data constituting the edit data stream in accordance with the edit matter acquired by the edit matter acquisition unit; and a recording processing unit adapted to record, as the free visual point moving image content in a recording unit, the edit data stream edited by the edit data setting unit and the free visual point moving image stream corresponding to the edit data stream.

(10)

The recording device recited in (9) above, in which the edit data stream is received in the edit data setting unit and further a free visual point moving image stream is received in the recording processing unit at the time of recording the free visual point moving image content in the recording device, and the edit data setting unit edits the edit data on the basis of the edit matter acquired by the edit matter acquisition unit in accordance with operation by a user.

(11)

The recording device recited in (9) or (10) above, in which the edit data setting unit sets priority information indicating priority of display of the 3D model as additional information of the edit data.

(12)

The recording device recited in any one of (9) to (11), in which the edit data setting unit sets viewing age restriction information indicating an age to restrict display of the 3D model as the additional information of the edit data.

(13)

A recording method including steps of:

acquiring an edit matter for additional information to be referred to at the time of controlling display of a 3D model arranged in a space recreated by a free visual point moving image stream in accordance with basic information set in edit data constituting an edit data stream of free visual point moving image content including the free visual point moving image stream and the edit data stream;

editing, in accordance with the acquired edit matter, the additional information of the edit data constituting the edit data stream; and recording, as the free visual point moving image content in a recording unit, the edited edit data stream and the free visual point moving image stream corresponding to the edit data stream.

(14)

A program causing a computer to execute recording processing including steps of:

acquiring an edit matter for additional information to be referred to at the time of controlling display of a 3D model arranged in a space recreated by a free visual point moving image stream in accordance with basic information set in edit data constituting an edit data stream of free visual point moving image content including the free visual point moving image stream and the edit data stream;

editing, in accordance with the acquired edit matter, the additional information of the edit data constituting the edit data stream; and recording, as the free visual point moving image content in a recording unit, the edited edit data stream and the free visual point moving image stream corresponding to the edit data stream.

(15)

A reproducing/recording device including:

a reproduction processing unit adapted to reproduce free visual point moving image content including a free visual point moving image stream and an edit data stream;

a display control unit adapted to control, with reference to additional information set in edit data, display of a 3D model arranged in a space recreated by the free visual point moving image stream in accordance with basic information set in the edit data constituting the edit data stream;

an edit matter acquisition unit adapted to acquire an edit matter for additional information to be referred to at the time of controlling display of the 3D model arranged in the space recreated by the free visual point moving image stream in accordance with the basic information set in the edit data constituting the edit data stream of the free visual point moving image content including the free visual point moving image stream and the edit data stream;

an edit data setting unit adapted to edit the additional information of the edit data constituting the edit data stream in accordance with the edit matter acquired by the edit matter acquisition unit; and a recording processing unit adapted to record, as the free visual point moving image content in a recording unit, the edit data stream edited by the edit data setting unit and the free visual point moving image stream corresponding to the edit data stream.

(16)

A reproducing/recording method including steps of, at the time of reproducing free visual point moving image content:

reproducing free visual point moving image content including a free visual point moving image stream and an edit data stream; and controlling, with reference to additional information set in edit data, display of a 3D model arranged in a space recreated by the free visual point moving image stream in accordance with basic information set in the edit data constituting the edit data stream, and the method further including steps of, at the time of recording the free visual point moving image content:

acquiring an edit matter for the additional information to be referred to at the time of controlling display of the 3D model arranged in the space recreated by the free visual point moving image stream in accordance with the basic information set in the edit data constituting the edit data stream of the free visual point moving image content including the free visual point moving image stream and the edit data stream;

editing, in accordance with the acquired edit matter, the additional information of the edit data constituting the edit data stream; and recording, as the free visual point moving image content in a recording unit, the edited edit data stream and the free visual point moving image stream corresponding to the edit data stream.

(17)

A program causing a computer to execute reproduction recording processing including steps of, at the time of reproducing free visual point moving image content:

reproducing free visual point moving image content including a free visual point moving image stream and an edit data stream; and controlling, with reference to additional information set in edit data, display of a 3D model arranged in a space recreated by the free visual point moving image stream in accordance with basic information set in the edit data constituting the edit data stream, and the program further causes the computer to execute, at the time of recording the free visual point moving image content, the reproduction recording processing including steps of:

acquiring an edit matter for the additional information to be referred to at the time of controlling display of the 3D model arranged in the space recreated by the free visual point moving image stream in accordance with the basic information set in the edit data constituting the edit data stream of the free visual point moving image content including the free visual point moving image stream and the edit data stream;

editing, in accordance with the acquired edit matter, the additional information of the edit data constituting the edit data stream; and recording, as the free visual point moving image content in a recording unit, the edited edit data stream and the free visual point moving image stream corresponding to the edit data stream.

Note that the embodiment of the present disclosure is not limited to the above-described embodiment, and various kinds of modifications can be made within a range not departing from the gist of the present disclosure.

REFERENCE SIGNS LIST

11 Recording/reproducing device
12 Operation unit
13 Display unit
14 Data input unit
21 Content recording unit
22 Reproduction processing unit
23 3D model building unit
24 Display control unit
25 Edit matter acquisition unit
26 Edit data setting unit
27 Recording processing unit

The invention claimed is:

1. A reproducing device, comprising:
a central processing unit (CPU) configured to:
reproduce free visual point moving image content that includes a free visual point moving image stream and an edit data stream;
control display of a plurality of 3D models based on basic information and additional information set in edit data that constitutes the edit data stream, wherein
the plurality of 3D models is arranged in a space recreated based on the free visual point moving image stream,
the additional information includes priority information that sets a priority of a first 3D model as a 1-bit value, and
the 1-bit value represents the priority of a display of the first 3D model relative to a priority of the display of the plurality of 3D models arranged on the space; and
control the display of a surface of the first 3D model of the plurality of 3D models on a front side and a surface of a second 3D model of the plurality of 3D models on a back side of the surface of the first 3D model based on the 1-bit value and based on a coincidence between the surface of the first 3D model and the surface of the second 3D model.

2. The reproducing device according to claim 1, wherein the additional information further includes viewing age restriction information that indicates an age to restrict the display of the plurality of 3D models, and
based on the viewing age restriction information set in the edit data that is equal to or younger than a viewing age restriction information preset in the reproducing device, the CPU is further configured to control the display of the plurality of 3D models corresponding to the edit data.

3. The reproducing device according to claim 2, wherein the free visual point moving image content includes an audio data stream and an audio edit data stream, and
the CPU is further configured to control output of an audio data corresponding to the edit data based on the viewing age restriction information set in the edit data that constitutes an audio edit data.

4. A reproducing method, comprising:
reproducing, by a processor, free visual point moving image content that includes a free visual point moving image stream and an edit data stream;
controlling, by the processor, display of a plurality of 3D models based on basic information and additional information set in edit data that constitutes the edit data stream, wherein
the plurality of 3D models is arranged in a space recreated based on the free visual point moving image stream,
the additional information includes priority information that sets a priority of a first 3D model as a 1-bit value, and
the 1-bit value represents the priority of a display of the first 3D model relative to a priority of the display of the plurality of 3D models arranged on the space; and
controlling the display of a surface of the first 3D model of the plurality of 3D models on a front side and a surface of a second 3D model of the plurality of 3D models on a back side of the surface of the first 3D model based on the 1-bit value and based on a coincidence between the surface of the first 3D model and the surface of the second 3D model.

5. A non-transitory computer-readable medium having stored thereon, computer-executable instructions which, when executed by a computer, cause the computer to execute operations, the operations comprising:
reproducing free visual point moving image content that includes a free visual point moving image stream and an edit data stream;
controlling display of a plurality of 3D models based on basic information and additional information set in edit data that constitutes the edit data stream, wherein
the plurality of 3D models is arranged in a space recreated based on the free visual point moving image stream,
the additional information includes priority information that sets a priority of a first 3D model as a 1-bit value, and
the 1-bit value represents the priority of a display of the first 3D model relative to a priority of the display of the plurality of 3D models arranged on the space; and
controlling the display of the first 3D model of a surface of the plurality of 3D models on a front side and a surface of a second 3D model of the plurality of 3D models on a back side of the surface of the first 3D model based on the 1-bit value and based on a coincidence between the surface of the first 3D model and the surface of the second 3D model.

6. A recording device, comprising:
a central processing unit (CPU) configured to:
acquire an edit matter for additional information that is referred to at a time of display of a plurality of 3D models, wherein
the plurality of 3D models is arranged in a space recreated based on a free visual point moving image stream,
the display of the plurality of 3D models is based on basic information and the additional information set in edit data that constitutes an edit data stream of free visual point moving image content, and
the free visual point moving image content includes the free visual point moving image stream and the edit data stream;
edit the additional information of the edit data that constitutes the edit data stream based on the edit matter;
set priority information as the additional information, wherein
the priority information that sets a priority of a first 3D model as a 1-bit value,
1-bit value represents the priority of a display of the first 3D model relative to a priority of the display of the plurality of 3D models, and
based on the 1-bit value and a coincidence between a surface of the first 3D model and a surface of a second 3D model, the surface of the first 3D model is displayed on a front side and the surface of the second 3D model is displayed on a back side of the surface of the first 3D model; and
record, as the free visual point moving image content, the edited edit data stream and the free visual point moving image stream corresponding to the edit data stream.

7. The recording device according to claim 6, wherein the CPU is further configured to:
receive the edit data stream;
receive the free visual point moving image stream at a time of the recording of the free visual point moving image content; and edit the edit data based on the edit matter, wherein the edit matter is received based on a user operation.

8. The recording device according to claim 6, wherein the CPU is further configured to set viewing age restriction information that indicates an age to restrict the display of the plurality of 3D models as the additional information of the edit data.

9. A recording method, comprising:
acquiring, by a processor, an edit matter for additional information that is referred to at a time of display of a plurality of 3D models, wherein
the plurality of 3D models is arranged in a space recreated based on a free visual point moving image stream,
the display of the plurality of 3D models is based on basic information and the additional information set in edit data that constitutes an edit data stream of free visual point moving image content, and
the free visual point moving image content includes the free visual point moving image stream and the edit data stream;
editing, by the processor, the additional information based on the acquired edit matter;
setting, by the processor, priority information as the additional information, wherein
the priority information that sets a priority of a first 3D model as a 1-bit value,
the 1-bit value represents the priority of a display of the first 3D model relative to a priority of the display of the plurality of 3D models, and
based on the 1-bit value and a coincidence between a surface of the first 3D model and a surface of a second 3D model, the surface of the first 3D model is displayed on a front side and the surface of the second 3D model is displayed on a back side of the surface of the first 3D model; and
recording, by the processor, the edited edit data stream and the free visual point moving image stream corresponding to the edit data stream as the free visual point moving image content.

10. A non-transitory computer-readable medium having stored thereon computer-executable instructions which, when executed by a computer, cause the computer to execute operations including:
acquiring an edit matter for additional information that is referred to at a time of display of a plurality of 3D models, wherein
the plurality of 3D models is arranged in a space recreated based on a free visual point moving image stream,
the display of the plurality of 3D models is based on basic information and the additional information set in edit data that constitutes an edit data stream of free visual point moving image content, and
the free visual point moving image content includes the free visual point moving image stream and the edit data stream;
editing, based on the acquired edit matter, the additional information of the edit data that constitutes the edit data stream;
setting priority information as the additional information, wherein
the priority information that sets a priority of a first 3D model as a 1-bit value,
the 1-bit value represents the priority of a display of the first 3D model relative to a priority of the display of the plurality of 3D models, and
based on the 1-bit value and a coincidence between a surface of the first 3D model and a surface of a second 3D model, the surface of the first 3D model is displayed on a front side and the surface of the second 3D model is displayed on a back side of the surface of the first 3D model; and
recording, as the free visual point moving image content, the edited edit data stream and the free visual point moving image stream corresponding to the edit data stream.

11. A reproducing/recording device, comprising:
a central processing unit (CPU) configured to:
reproduce free visual point moving image content that includes a free visual point moving image stream and an edit data stream;
to control, display of a plurality of 3D models based on basic information and additional information set in edit data that constitutes the edit data stream, wherein
the plurality of 3D models is arranged in a space recreated based on the free visual point moving image stream,
the additional information includes priority information that sets a priority of a first 3D model as a 1-bit value, and the 1-bit value represents the priority of a display of the first 3D model relative to a priority of the display of the plurality of 3D models arranged on the space;

control the display of a surface of the first 3D model of the plurality of 3D models on a front side and a surface of a second 3D model of the plurality of 3D models on a back side of the surface of the first 3D model based on the 1-bit value and based on a coincidence between the surface of the first 3D model and the surface of the second 3D model;

acquire an edit matter for the additional information that is referred to at a time of the display of the plurality of 3D models arranged in the space;

edit the additional information of the edit data that constitutes the edit data stream based on the edit matter; and record, as the free visual point moving image content, the edited edit data stream and the free visual point moving image stream corresponding to the edit data stream.

12. A reproducing/recording method, comprising:

reproducing free visual point moving image content, wherein reproducing the free visual point moving image content comprises:

reproducing, by a processor, the free visual point moving image content that includes a free visual point moving image stream and an edit data stream;

controlling, by the processor, display of a plurality of 3D models based on basic information and additional information set in edit data that constitutes the edit data stream, wherein the plurality of 3D models is arranged in a space recreated based on the free visual point moving image stream, the additional information includes priority information that sets a priority of a first 3D model as a 1-bit value, and the 1-bit value represents the priority of a display of the first 3D model relative to a priority of the display of the plurality of 3D models arranged on the space; and controlling, by the processor, the display of a surface of the first 3D model of the plurality of 3D models on a front side and a surface of a second 3D model of the plurality of 3D models on a back side of the surface of the first 3D model based on the 1-bit value and based on a coincidence between the surface of the first 3D model and the surface of the second 3D model; and recording the free visual point moving image content, wherein the recording of the free visual point moving image content comprises:

acquiring, by the processor, an edit matter for the additional information that is referred to at a time of controlling the display of the plurality of 3D models arranged in the space;

editing, by the processor, the additional information based on the edit data; and recording, by the processor, the edited edit data stream and the free visual point moving image stream corresponding to the edit data stream as the free visual point moving image content.

13. A non-transitory computer-readable medium having stored thereon a computer-executable instructions which, when executed by a computer, cause the computer to execute operations including:

reproducing free visual point moving image content, wherein reproducing the free visual point moving image content comprises:

reproducing the free visual point moving image content that includes a free visual point moving image stream and an edit data stream;

controlling display of a plurality of 3D models based on basic information and additional information set in edit data that constitutes the edit data stream, wherein the plurality of 3D models is arranged in a space recreated based on the free visual point moving image stream, the additional information includes priority information that sets a priority of a first 3D model as a 1-bit value, and the 1-bit value represents the priority of a display of the first 3D model relative to a priority of the display of the plurality of 3D models arranged on the space; and controlling the display of a surface of the first 3D model of the plurality of 3D models on a front side and a surface of a second 3D model of the plurality of 3D models on a back side of the surface of the first 3D model based on the 1-bit value and based on a coincidence between the surface of the first 3D model and the surface of the second 3D model; and recording the free visual point moving image content, wherein the recording of the free visual point moving image content comprises:

acquiring an edit matter for the additional information that is referred to at a time of controlling the display of the plurality of 3D models arranged in the space;

editing, based on the acquired edit matter, the additional information of the edit data that constitutes the edit data stream; and recording, as the free visual point moving image content, the edited edit data stream and the free visual point moving image stream corresponding to the edit data stream.

* * * * *